United States Patent

Frohman-Bentchkowsky

[15] 3,660,819

[45] May 2, 1972

[54] FLOATING GATE TRANSISTOR AND METHOD FOR CHARGING AND DISCHARGING SAME

[72] Inventor: Dov Frohman-Bentchkowsky, Los Altos, Calif.

[73] Assignee: Intel Corporation, Mountain View, Calif.

[22] Filed: June 15, 1970

[21] Appl. No.: 46,148

[52] U.S. Cl. ........................ 317/235 R, 317/235 B, 307/238, 307/304

[51] Int. Cl. ........................ H01l 11/14

[58] Field of Search ........................ 317/235

[56] References Cited

UNITED STATES PATENTS 3,339,086 8/1967 Shockley ........................ 317/235

3,500,142 3/1970 Kahng ........................ 317/235

FOREIGN PATENTS OR APPLICATIONS 813,537 5/1969 Canada ........................ 317/235

OTHER PUBLICATIONS

IEEE Trans on Electron Devices, " Influence of Heat and Ionizing Irradiations on the Charge Distribution..." by Kooi, Feb. 1966, pages 238- 244

IBM Tech. Discl Bul, " Electron-Beam Testing Apparatus for Integrated Circuits" by Walker et al., Vol. 10, No. 2, July 1967 pages 175- 176

Electronics, " Hughes Sets New Kind of Trap to Wed Mos to Silicon Nitride April 28, 1969, pages 39 and 40.

*Primary Examiner*—Jerry D. Craig

*Attorney*—Spensley, Horn and Lubitz

[57] ABSTRACT

A floating gate transistor comprising a floating silicon or metal gate in a field effect transistor which is particularly useful in a read-only memory is disclosed. The gate which is surrounded by an insulative material such as $SiO_2$ is charged by transferring charged particles (i.e., electrons) across the insulation from the substrate during an avalanche (breakdown) condition in the source or drain junctions of the transistor.

9 Claims, 2 Drawing Figures

DOV FROHMAN-BENTCHKOWSKY
INVENTOR

BY Spensley & Horn
ATTORNEYS

FLOATING GATE TRANSISTOR AND METHOD FOR CHARGING AND DISCHARGING SAME

BACKGROUND OF THE INVENTION

1. Field of the Invention

The invention relates to the field of transistors having a floating gate.

2. Prior Art

In the prior art, there has been suggested the use of a field effect transistor having a floating metal gate for use as a memory element in a read only memory array. The floating gate in the memory array is either electrically charged or not charged and used in a similar fashion to other bi-stable devices such as magnetic cores, flip-flops, etc. A reference to the use of a floating metal gate in a field effect transistor is made in "A Floating Gate and Its Application to Memory Devices," Bell Systems Technical Journal, 46,1283 (1967) by D. Khang and S. M. Sze.

The floating gate has not been used in memory devices since the prior art technology has not disclosed a practical embodiment of a floating gate transistor. FIG. 1 illustrates a typical prior art embodiment of a floating gate transistor; its impracticalities will be discussed in conjunction with that figure.

SUMMARY OF THE INVENTION

A transistor which in its presently preferred embodiment comprises a floating gate insulator semiconductor device is described. The transistor comprises a substrate of a first conductivity type and a pair of spaced apart regions of the opposite conductivity type to the first conductivity type disposed in the substrate. A gate is spatially disposed between the regions and separated therefrom by an insulative layer. The gate is substantially surrounded by an insulative layer that may be of the same type that separates it from the region or a different type and no electrical connections are made to the gate. Contact means such as metal contacts are provided to the regions. In the presently preferred embodiment of the invention, the substrate comprises an N-type silicon and the regions are of a P-type conductivity. The gate may be conductive or semiconductor materials such as silicon or germanium, aluminum, molybdenum or other conductive metals.

An electrical charge is placed on the gate by applying a voltage between one of the regions and the substrate of sufficient magnitude to cause a breakdown (e.g., an avalanche injection condition) in at least one of the junctions defined by the interface of the regions and substrate. This causes electrons to enter and pass through the insulation separating the substrate and gate and to charge the gate. The charge may be removed from the gate by subjecting the transistor to X-rays or to ultraviolet light.

It is an object of the present invention to provide a floating gate transistor which is easy to manufacture and which may be manufactured utilizing proven processes.

It is still another object of the present invention to provide a floating gate transistor which is particularly adaptable for use with a silicon gate.

Another object of the present invention is to provide a storage retention transistor which has the capability of providing long term storage without the continuous application of power.

It is still a further object of the present invention to provide a method for charging a floating gate utilizing relatively low electric fields and voltage across the insulator, thereby preventing the destructive breakdown of the insulation which surrounds the floating gate.

DETAILED DESCRIPTION OF THE INVENTION

A field effect transistor having a floating gate which is particularly useful as a component in a read-only memory is disclosed. The presence or lack of an electrical charge on the gate is sensed and this information used in the same manner as other bi-stable memory devices such as magnetic cores and flip-flops are used in forming a memory array. Once the gate of the transistor is charged, the charge remains permanently (10 years at 125° C.) on the gate and the existence or non-existence of the charge on the gate is readily ascertainable by sensing the conductivity characteristics between the source and drain region of the field effect transistor. Typically, the field effect transistor readily conducts a current between its source and drain once the gate is negatively charged and likewise the transistor will not conduct a current when the gate is not charged assuming that the voltage applied to the source or drain junction is less than that required to cause an avalanche breakdown in the transistor.

Figure 1:
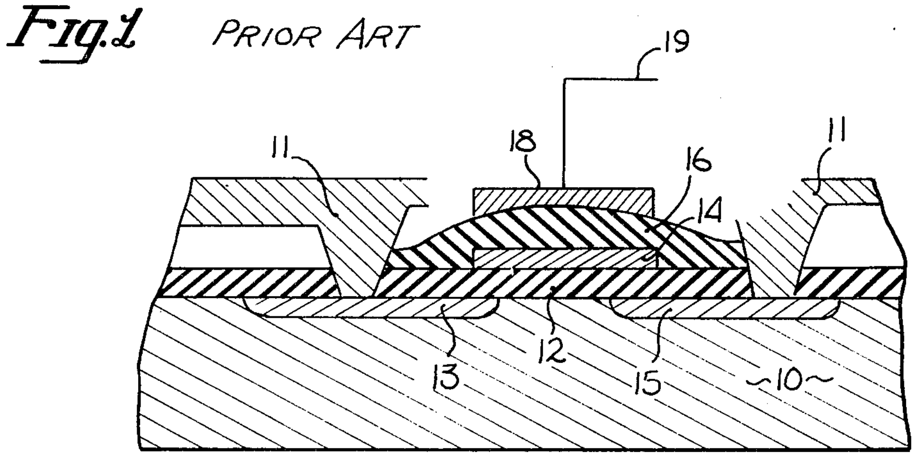
FIG. 1 illustrates a cross-section of a floating gate transistor as disclosed in the prior art.

Referring to FIG. 1, a floating gate transistor as known in the prior art is illustrated. The transistor comprises a field effect device having a source and drain hereafter interchangeably referred to as regions 13 and 15 which are produced in a substrate 10. The substrate 10 is opposite in conductivity type to the regions 13 and 15. For example, if the substrate 10 is an N-conductivity type, the regions 13 and 15 would be a P-conductivity type. Metal contacts 11 are coupled to the regions 13 and 15 to allow a current to be passed between the regions 13 and 15. An insulative layer 12 separates the floating gate 14 from the substrate 10 and regions 13 and 15. A second insulative layer 16 which serves to completely surround the floating gate 14, separates the charging gate 18 from the remainder of the transistor device. The gates 14 and 18 are made of material such as aluminum, the regions 13 and 15 and substrate 10 may be made from such material as appropriately doped silicon or germanium.

In the operation of the transistor of FIG. 1, a charge, if one is desired, is placed on the floating gate 14, by applying a voltage between the charging gate 18 via lead 19 and substrate 10. A charge is transported from the substrate across the insulation 12 into the floating gate 14. In order for a charge to be thusly transported without applying a voltage large enough to permanently breakdown the insulative materials 12 or 16, it is necessary that layer 12 be relatively thin and that a high ratio of dielectric constants exist between the materials used for layers 16 and 12. This produces a higher field strength across layer 12 than layer 16 and allows a charge to be transported onto the gate 14. In practice, in addition to the difficulty of producing a uniform thin insulation, it is very difficult to deposit a metal layer over this thin insulation without producing current paths between the metal and substrate. Also, to achieve the high ratio of dielectric constants, a single insulative material such as silicon dioxide cannot be used for both layers 12 and 16. Thus, the device illustrated in FIG. 1 is not very useful since the above described restraints make it impractical to produce with presently known techniques.

Figure 2:
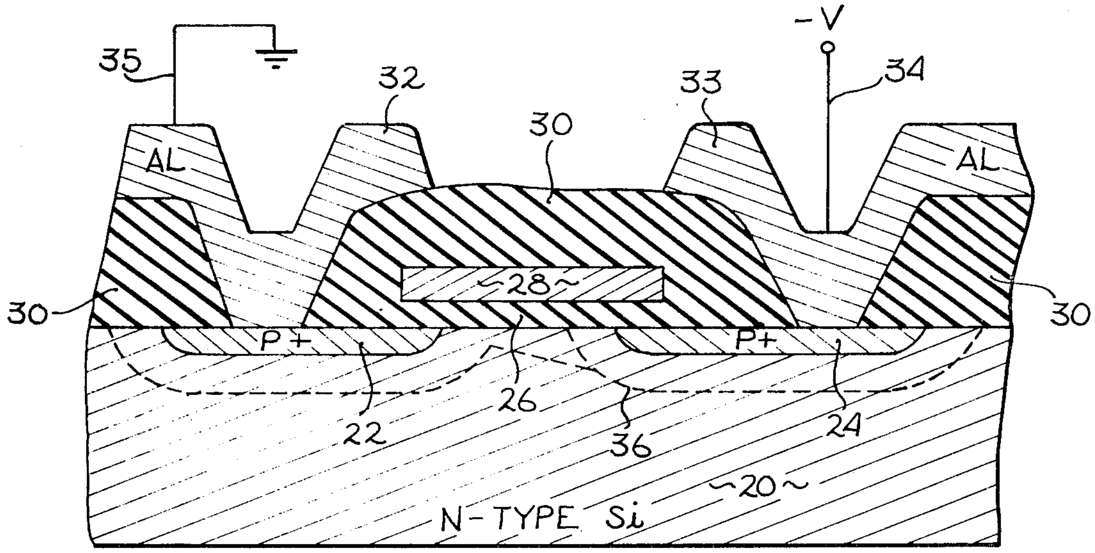
FIG. 2 illustrates a cross-section of a floating gate transistor as described by the present invention.

In FIG. 2, a cross-sectional view of a field effect transistor built in accordance with the teachings of the present invention is illustrated. While the present invention is illustrated in conjunction with a particular field effect device, it is readily apparent that other types of field effect transistors may be modified in accordance with the teachings of this patent and utilized as a component in a read-only array as well as in other applications. The transistor of FIG. 2 comprises a pair of spaced apart regions 22 and 24 (source and drain) which are opposite in conductivity type to the substrate 20. The regions which define a pair of PN junctions, one between each region and the substrate may be produced on the substrate 20 utilizing commonly known techniques. The gate 28 of the transistor which is spatially disposed between the regions 22 and 24 preferably completely enclosed within insulative layers 26 and 30, so that no electrical path exists between the gate 28 and any other parts of the transistor. Metal contacts 32 and 33 are utilized to provide contacts to the regions 22 and 24, respectively. The transistor of FIG. 2 may be produced using known MOS or silicon gate technology.

In the present preferred embodiment of the invention, the substrate comprises an N-type silicon, the regions 22 and 24 comprise P-type regions, the contacts 32 and 33 are aluminum and the gate 28, which may be compatible conductive materials such as aluminum, comprises silicon. The insulative layer 26 and layer 30 may comprise a silicon oxide (e.g., SiO, $SiO_2$). For a more thorough discussion of the silicon gate technology, see IEEE Spectrum, Oct., 1969, *Silicon-gate Technology*, page 28, Vadasz, Moore, Grove and Rowe.

As was previously noted, the insulative layer 12 of the transistor illustrated in FIG. 1 had to be relatively thin in order to charge the gate 14. With the transistor of FIG. 2, the insulative layer 26 which separates the gate 28 from the substrate 20 may be relatively thick; for example, it may be 500 A. to 1,000 A. This thickness may be readily achieved utilizing present MOS technology. The layer 30 in the presently preferred embodiment comprises approximately 1,000 A. of the thermally grown silicon oxide directly above the gate 28 and approximately 1.0$\mu$ of vapor deposited silicon oxide above the thermal oxide.

Unlike the transistor of FIG. 1, the gate 28 of the transistor of FIG. 2 may be charged in accordance with the teachings of the present invention without the use of a charging gate, such as gate 18 of FIG. 1. The charge is placed on the gate 28 through the metal contacts 32, 33 and the substrate. The charge is transferred to the gate 28 through the insulative layer 26 by causing an avalanche breakdown condition in either of the PN junctions defined by regions 22 and 24 in the substrate 20. In FIG. 2, region 22 is illustrated coupled to the ground via the contact 32 and lead 35 and region 24 is illustrated coupled to a negative voltage via contact 33 and lead 34; also, the substrate is grounded. To charge the gate 28, a voltage is applied to lead 34 of sufficient magnitude to cause an avalanche breakdown of the junction defined by region 24 and substrate 20. When the avalanche breakdown occurs, the high energy electrons generated in this PN junction depletion region pass through the insulative layer 26 onto the gate 28 under the influence of the fringing field 36. Once the gate 28 is charged, it will remain charged for usefully long periods since no discharge path is available for the accumulated electrons within gate 28. (Note that the entire gate 28 is surrounded by an insulative layer such as a thermal oxide.) After the voltage has been removed from the transistor, the only other electric field in the structure is due to the accumulated electron charge within the gate 28 and this is not sufficient to cause charge to be transported across the insulative layer 26. (Note that the gate 28 could have been charged in the same manner as described with the substrate and/or contact 32 biased at some potential other than the ground potential.)

Theoretical calculations have indicated that a charge on a gate such as gate 28 should remain there for periods greater than 10 years even at operating temperatures of 125° C. Typically, the avalanche junction breakdown described occurs at a voltage of approximately 30 volts utilizing typical MOS devices and assuming an oxide thickness for layer 26 of approximately 1,000 A. In a typical read-only memory, the existence or non-existence of a charge on gate 28 may be determined by examining the characteristics of the transistors at the contacts 32 and 33. This may be done by applying a voltage between contacts 32 and 33. This voltage should be less than that required to cause an avalanche breakdown. The transistor more readily conducts if a charge exists on gate 28 when compared to the conducting of the same transistor without a charge on its gate. (The same structure can be made on a P-type substrate with N-type regions for the source and drain. In this case when the gate is charged negatively by avalanche injection, the conductance between source and drain is lower than for the same transistor without charge on the gate.) For a more complete analysis of the phenomena involved in the avalanche injection of electrons, see E. H. Nicollian, A. Goetzberger and C. N. Berglund, "Avalanche Injection Current and Charging Phenomena in Thermal $SiO_2$," Applied Physics Letters 15, 174 (1969).

A number of methods have been found for removing the charge from a gate 28. If the transistor of FIG. 2 is subjected to X-ray radiation, the charge on gate 28 is removed. Experiments have shown that radiation of $2 \times 10^5$ rads when applied even through the package containing the transistor will cause the charge to be removed from gate 28. Also, ultra-violet light of the order of magnitude 4ev's when applied directly to the transistor (not through the transistor package) will cause the charge to be removed from the gate 28. Subjecting the transistor to high temperatures (i.e., 450° C.) will also cause the charge to be removed, but this technique may result in permanently damaging the device.

Thus, a field effect transistor containing a floating gate which is completely surrounded by insulative material such as silicon dioxide, particularly adaptable for use in a read-only memory has been described. The transistor may be manufactured utilizing known MOS techniques. The contacts to the transistor which are used to determine the existence or non-existence of a charge on the gate are also used to place a charge on the gate. Unlike the prior art floating gate field effect transitors, a charging gate is not required and relatively thick easy to develop thermal oxide layers may be used between the floating gate and the substrate.

I claim:

1. A storage device comprising:
- a semiconductor body of a first conductivity type;
- a pair of spaced apart regions of opposite conductivity type to said first conductivity type, forming a pair of PN junctions in said body;
- a floating gate disposed spatially between said pair of spaced apart regions;
- an insulative layer between said body and said floating gate;
- insulative means covering said floating gate, said insulative means being free of any metallization employed primarily for charging said floating gate;
- means for applying a voltage to at least one of said spaced apart regions and said body of sufficient magnitude to cause an avalanche injection, thereby causing electrons to pass through said insulative layer onto said floating gate whereby said floating gate may be electrically charged.

2. The storage device defined in claim 1 wherein said insulative layer is at least approximately 500 A. thick.

3. The storage device defined in claim 1 wherein said first conductivity type is an N type.

4. The storage device defined in claim 2 wherein said first conductivity type is an N type.

5. The storage device defined in claim 4 wherein said floating gate comprises silicon.

6. The storage device defined in claim 5 wherein said body comprises silicon and said insulative layer and insulative means comprise silicon oxide.

7. The storage device defined in claim 6 including contact means for providing contact to said pair of spaced apart regions.

8. In a storage device comprising: a semiconductor substrate of a first conductivity type; a pair of spaced apart regions of opposite conductivity type, forming a pair of PN junctions in said substrate; a floating gate disposed spatially between said spaced apart regions; and insulative layer disposed between said substrate and said floating gate; and insulative means covering said floating gate, said insulative means being free from any metallization employed primarily for charging said floating gate;
- a method for placing an electrical charge on said gate comprising applying a voltage to at least one of said regions and said substrate of sufficient magnitude to cause an avalanche injection thereby causing electrons to pass through the insulation from said substrate to said floating gate to charge said gate.

9. The method defined in claim 8 wherein said voltage is approximately 30 volts.

* * * * *